US005580177A

United States Patent [19]
Gase et al.

[11] Patent Number: 5,580,177
[45] Date of Patent: Dec. 3, 1996

[54] PRINTER/CLIENT NETWORK WITH CENTRALLY UPDATED PRINTER DRIVERS AND PRINTER STATUS MONITORING

[75] Inventors: Stephen T. Gase; Craig R. White, both of Boise, Id.

[73] Assignee: Hewlett-Packard Company, Palo Alto, Calif.

[21] Appl. No.: 220,322

[22] Filed: Mar. 29, 1994

[51] Int. Cl.$^6$ .................................................. G06F 15/16
[52] U.S. Cl. ........................................ 400/61; 395/114
[58] Field of Search .............................. 400/61, 70, 76; 395/112, 114

[56] References Cited

U.S. PATENT DOCUMENTS

| | | | |
|---|---|---|---|
| 4,860,110 | 8/1989 | Kokubo | 395/112 |
| 4,968,159 | 11/1990 | Sasaki | 395/112 |
| 5,014,221 | 5/1991 | Mogul | 395/113 |
| 5,025,398 | 6/1991 | Nelson | 395/112 |
| 5,123,757 | 6/1992 | Nagaoka | 395/114 |
| 5,165,014 | 11/1992 | Vassar | 395/112 |
| 5,195,130 | 3/1993 | Weiss et al. | 379/98 |
| 5,228,118 | 7/1993 | Sasaki | 395/112 |
| 5,268,993 | 12/1993 | Ikenoue | 395/114 |
| 5,287,194 | 2/1994 | Lobiondo | 395/114 |
| 5,303,336 | 4/1994 | Kageyama | 395/112 |
| 5,392,419 | 2/1995 | Walton | 395/112 |
| 5,493,408 | 2/1996 | Kurogane et al. | 395/114 |
| 5,533,174 | 7/1996 | Flowers, Jr. et al. | 395/114 |
| 5,533,175 | 7/1996 | Lung et al. | 395/115 |

*Primary Examiner*—Edgar S. Burr
*Assistant Examiner*—Steven S. Kelley

[57] ABSTRACT

A network includes plural client processors, a file server and plural printers. Each client processor has memory that stores a printer driver procedure which enables the client processor to interface with at least one printer type. The file server includes memory for storing a most updated printer driver procedure for each printer type coupled to the file server. The file server is responsive to a print request from a client processor to assign a printer to the requesting client processor. The file server then in combination with the client processor determines if a printer driver procedure for the assigned printer in the client processor is identical to a most updated printer driver procedure stored in memory in the file server. If not, the file server enables alteration of the printer driver procedure in the client processor to bring it into coincidence with the most updated print driver procedure. A printer utility is also installed in each client processor and provides the means for automatically determining network status and for indicating to the user whether the network is available or unavailable, and a message indicating the reason for the unavailability.

7 Claims, 6 Drawing Sheets

PRINTER/CLIENT NETWORK WITH CENTRALLY UPDATED PRINTER DRIVERS AND PRINTER STATUS MONITORING

FIELD OF THE INVENTION

This invention relates to printers that are connected to a network and are accessible from a plurality of client processors via a file server and, more particularly, to such a network wherein printer driver procedures installed in client processors are centrally available from a most-updated version of the printer driver procedure and, further, wherein the client processors are continuously informed of a printer's availability status.

BACKGROUND OF THE INVENTION

The most widely used operating systems in desktop computers are DOS (Disk Operating System) and Windows, both products of the Microsoft Corporation, Redmond, Washington. The DOS operating system requires that applications include an embedded printer driver module that enables communications with a connected printer. An application, therefore, must have embedded in it an appropriate printer driver for a connected printer. If two or more printers of different kinds are connected to a computer having DOS applications, each application requiring use of the printers must include embedded printer drivers for each printer type. By contrast, the Windows operating system employs separate printer driver modules and all applications written for a Windows operating system are enabled to employ a printer driver module in a generic manner. Thus, Windows applications have a standard interface that matches the preexisting printer driver module. If a computer is required to interface with two or more different types of printers, each requiring a separate printer driver, the Windows operating system will require a printer driver module for each of the different type printers.

In a network environment where multiple client computers are connected via a file server or interconnecting network to multiple printers, a number of administrative problems arise that are not present when a single computer is connected to a single printer. For instance, if a new printer type is added to a site, each client computer must be informed of the network configuration change and a new printer driver must be installed on the client computer for the device. Otherwise, the client computer is not able to use the newly added printer. Further, as new printer drivers are provided by manufacturers to correct previously discovered defects or to provide enhancements to previous printer drivers, each client computer must receive a new printer driver. These actions can cause substantial network interruption while the new printer drivers are being installed.

In a network of the nature described above wherein client computers employ the Windows operating system, a separate file server installation is often used to enable communications between the client computers and network-connected printers. In order to determine network print function availability, a user of a client computer must have detailed information regarding precisely where to inquire to access network status information. In a network operating under the NetWare environment (Novell Corporation, Provo, Utah), there are many pieces of status information that, together, affect an overall print operation. For instance, the Novell print server and queue management system both evidence status information regarding printer availability; however, their status information can only be accessed by knowing where (and how) to inquire. Further, even if the user knows how to obtain network status information, it is up to the user to understand the meaning of the status information.

Client computers connected to a printer network employ a software utility to control interface functions with a connected file server. The file server, in turn, enables access to various printers connected in the network. Such a software utility often can only run in a single operating system environment, i.e., DOS, Windows, OS/2, etc. When there is a requirement that such a software utility operate with more than one operating system environment, the traditional solution has been to develop to separate utilities, each with a different name, and method to invoke. For instance, if a client computer has both DOS and Windows, the client computer includes a printer utility written specifically for DOS and one specifically written for Windows. The user must thus remember the name of the printer utility written for the operating system the client computer is running under.

Accordingly, it is an object of this invention to provide a network that includes multiple printers and client computers, wherein a file server is included that allows central administration and updating of printer driver installations.

It is a further object of this invention to provide an improved printer/client computer network where information is continuously provided regarding network status so as to enable a user to assess an ability to accomplish a print job.

It is still another object of this invention to provide an improved system for insuring that a proper printer utility will be loaded in a client computer even if the wrong printer utility is requested by the user.

SUMMARY OF THE INVENTION

A network includes plural client processors, a file server and plural printers. Each client processor has memory that stores a printer driver procedure which enables the client processor to interface with at least one printer type. The file server includes memory for storing a most updated printer driver procedure for each printer type coupled to the file server. The file server is responsive to a print request from a client processor to assign a printer to the requesting client processor. The client processor then determines if a printer driver procedure for the assigned printer in the client processor is identical to a most updated print driver procedure stored in memory in the file server. If not, the client processor causes alteration of is printer driver procedure to bring it into coincidence with the most updated print driver procedure. A printer utility is also installed in each client processor and provides the means for automatically determining network status and for indicating to the user whether the network is available or unavailable, and a message indicating the reason for the unavailability.

DETAILED DESCRIPTION OF THE INVENTION

Figure 1:
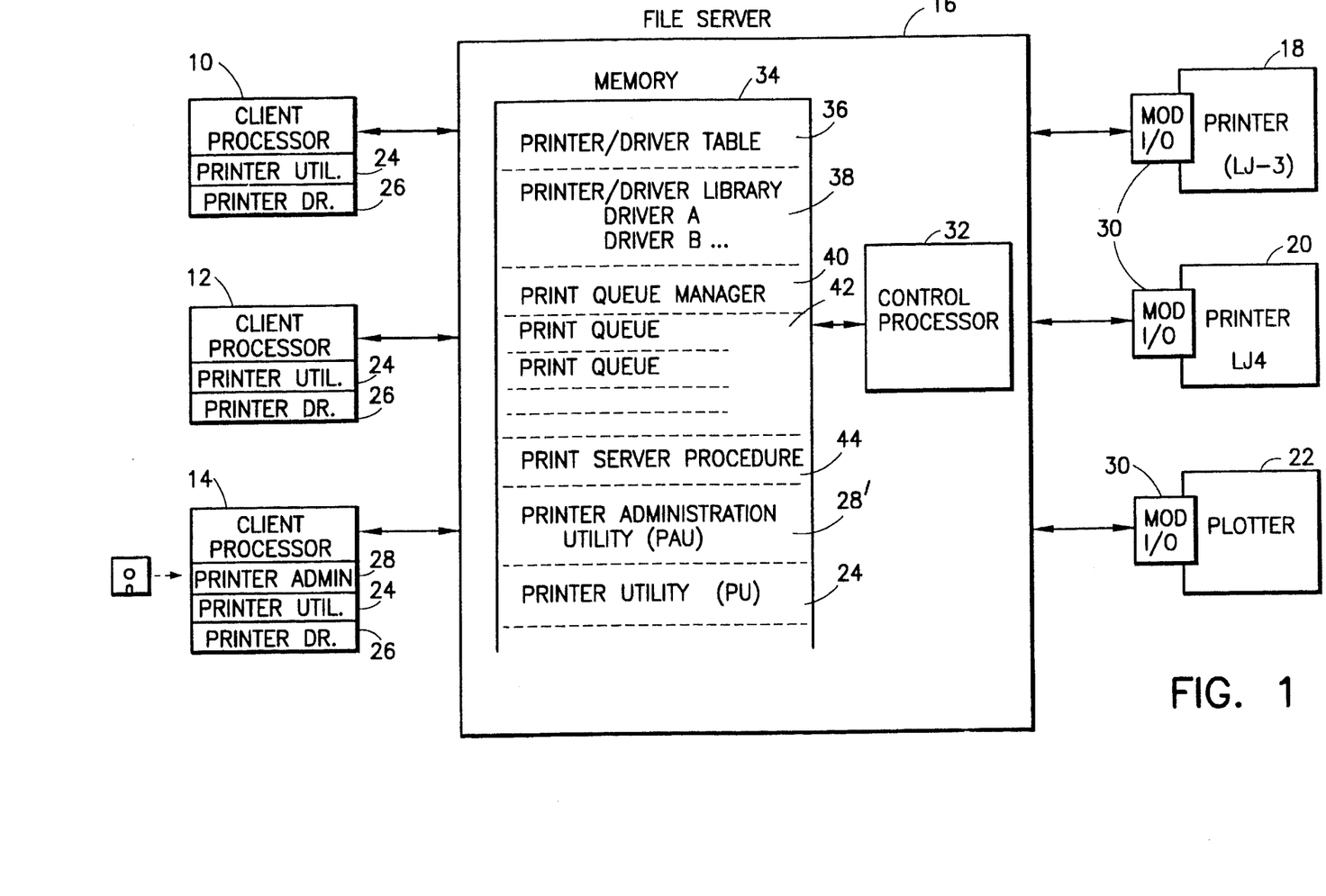
FIG. 1 is a block diagram of a system incorporating the invention.

Referring to FIG. 1, client processors 10, 12 and 14 are connected, via an intervening network, to a file server 16. A plurality of printers 18, 20, 22 are also connected to file server 16 and are made available for use by any of client processors 10, 12 or 14 through the action of file server 16. Each client processor includes a printer utility program 24 which allows a user to select a printer connected to file server 16 (e.g., printer 18, printer, 20, etc.) as a default printer without the user needing to know any of the network interactions that are required to establish connection with the printer. Thus, any time a user executes a print command from a client processor, printer utility 24 automatically makes connection with the default printer.

Hereafter, it will be assumed that each of client processors 10, 12, 14 employs the Windows operating system. Client processors 10, 12, 14 further include a printer driver procedure 26 that enables a client processor to configure an output data stream that will be recognized and operated upon by a connected printer. The output data stream implements necessary hand-shaking actions required to enable interaction between the client processor and the connected printer. One client processor, in this case client processor 14, is designated as a network administrator and includes a printer administration utility program 28 which enables uploading of new programs into file server 16.

printers 18 and 20 are provided with modular input/output (I/O) plug-in cards 30. A similar modular I/O plug-in card 30 is provided for plotter 22. Each modular I/O card 30 is provided with a microprocessor and a shared memory through which data is provided to a connected printer/plotter. A modular I/O card 30 provides interface capability between a connected printer/plotter and file server 16. A modular I/O card 30 includes all network protocol information required to establish a connection and operate over the network created by file server 16, and to enable print jobs to be received and transmitted. The I/O function is configured on a pluggable card for the reason that printers, 18 and 20, and plotter 22 may be connected to any of a plurality of networks, each such network having a unique network protocol. By enabling I/O functions to be handled by a modular I/O card, a printer or plotter may be interfaced with any of the plurality of networks—so long as the proper modular I/O card 30 is inserted. Such a modular interface function is described in U.S. Pat. No. 5,197,128 to Campbell et al. which is assigned to the same Assignee as this application. The disclosure of U.S. Pat. No. 5,197,128 is incorporated herein by reference.

File server 16 provides a central control function which enables one or more of client processor 10, 12, 14 to be connected to one or more printers 18, 20 or to plotter 22. Within file server 16 is a control processor 32 that operates file server 16 and its interconnection functions. A memory 34 in file server 16 stores a plurality of data structures that are necessary for the operation of the client processor/printer network. One such data structure is a printer/driver table 36 which contains a listing that associates each printer connected to file server 16 with a printer driver procedure for the printer. Data from printer/driver table 36 is used to access a printer driver procedure stored in printer/driver library 38. It is to be understood that a number of different types of printers are connectable to file server 16. For instance, printer 18 is a LaserJet III model manufactured by the assignee hereof whereas printer 20 is a LaserJet IV model. Different printer drivers are required for each of the aforesaid models. A printer driver procedure for each is stored in printer/driver library 38.

Memory 34 further contains a print queue manager procedure 40 which receives print jobs and print job requests from connected client processors and places them in one or more of print queues 42. When a printer is prepared to receive a new print job, it notifies a print server procedure 44 which then arranges to feed a print job to the connected printer from one of print queues 42.

Also contained within memory 34 is a most updated version 28' of printer administration utility program 28 and updated version 24' of printer utility program 24. Because memory 34 stores (i) most updated versions of printer drivers in printer/driver library 38 (ii) printer administration utility 28 and (iii) printer utility 24, there always exists a repository where the most updated version of a program can be found. Thus, when a client processor elects to utilize a particular printer, it further determines whether its printer driver 26 is consistent with the most updated printer driver version in printer driver library 38. If not, the client processor causes its printer driver 26 to be revised or overwritten to reflect the most updated printer/driver version contained within printer driver library 38. Likewise, if any changes are made to printer administration utility 28 or printer utility 24, the changed program version 24', 28' merely needs to be loaded into memory 34 and then downloaded into all client processors 10, 12 and 14, as needed.

As above indicated, printer administration utility 28 is present in only one client processor (e.g., processor 14), which acts as an overall system administrator. The printer administration utility 28 enables a printer driver, for instance, to be loaded onto client processor 14 and then uploaded into printer/driver library 38. Furthermore, printer administration utility 28 enables printer/driver table 36 to be updated to reflect the newly inserted data.

printer administration utility 28, among other functions, enables the file server 16 to indicate to each client processor a list of available printer/plotters found on the network.

Each modular I/O card 30 periodically "advertises" its availability by the transmission of messages to file server 16. Each message includes the name of the service, the type of service and the address of the available service (e.g. print actions). This data is accumulated within file server 16 and enables the generation of display presentation 50 (see FIG. 2) at a client processor. Display screen presentation 50 appears on a client processor in response to a user's request to show available printers. Screen presentation 50 is presented under control of printer utility 24 which initially determines a default printer destination and shows the name and states for that printer at 55 and 58 respectively in presentation 50. Printer utility 24 then examines the printer/driver table 36 contained in file server 16 for the matching printer driver. If the existing driver in the client processor requires an update, the new printer driver is reinstalled. Screen presentation 50 at location 52 shows a list of other potential printers that are available to the client processor. By a user selecting one of the entries in the list by movement of selection bar 54, status indicator 58 and status message 60 are updated to reflect the status of the selected printer.

Figure 2:
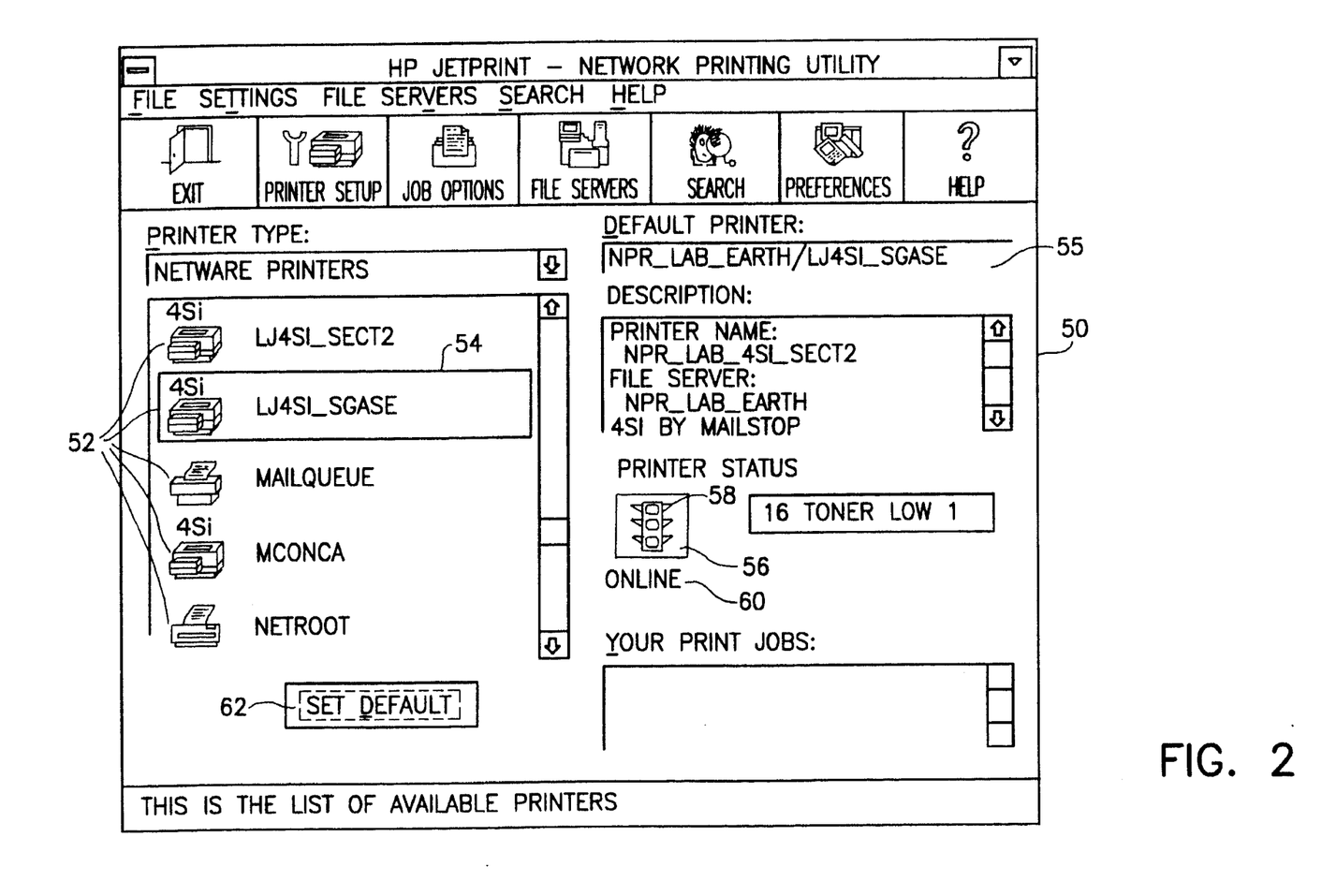
FIG. 2 is a representative display that appears on the screen of a client processor.

Selecting a SET DEFAULT button 62 will cause the highlighted entry to become the new default printer. The default printer is used by all Windows applications for printing documents. Printer utility 24 will also install a new and matching driver for this printer, obtained from the printer/driver database."

Upon the user selecting a particular printer by the movement of selection bar 54, status box 56 automatically indicates an availability status of the selected printer. The status is indicated by traffic light-like icon 58 which displays either red, yellow or green lights, depending upon the status of the selected printer and the intervening network. More particularly, when a user positions a cursor at a selected printer and performs a selection action, printer utility procedure 24 enables automatic connection to file server 16 and to an appropriate print queue 42 which serves the selected printer. At the same time, printer utility procedure 24 gathers status information with respect to print queue 42; print server procedure 44; modular I/O card 30; and its connected printer (e.g., printer 20). The status data is accumulated in the aforesaid order and if, at any time, a status of a system entity is found to be other than available (i.e., "green"), a message is immediately generated and displayed location 60 on presentation 50 to inform the user that a print action is not immediately available upon the selected printer and, the reason why. At such time, icon 58 displays either a yellow or red light, depending upon the particular status condition.

The automated status response relieves the user from having to know where to inquire to find status information from each of the subsystems that are critical to the performance of a print job. As multiple status messages are available, a hierarchy is used to determine which status message to display. First the print queue status is determined; then the print server procedure status; then the modular I/O status; and finally the printer status. When a first status indication is found that gives rise to a "red" or "yellow" indication, that status controls which message is presented to the user at the client processor. If all status conditions are "green", the print action is enabled.

The following is a partial list of system conditions for which green, yellow and red manifest at status window 56.
Print queue status:
  green condition: queue active and available;
  yellow condition: print job can not be serviced;
  red conditions; cannot add jobs; queue status error.
Print server status:
  green conditions: waiting for jobs; printing;
  yellow conditions: private; paused;
  red conditions: waiting for form, stopped, ready to go down, not connected.
Modular I/O card status:
  green conditions: busy; connected to file server.
  yellow conditions: initializing interface; trying to connect to print server; trying to connect to file server; connecting to file server; print server requested disconnect.
  red conditions: network protocol not configured; shutdown; unable to find print server; unable to connect to print server; printer number in use; printer number not defined, etc.
Printer status:
  green conditions: printing test page; printing; online.
  yellow conditions: warming up, resetting printer; output bin full; paper out; offline; toner low, etc.
  red conditions: printer error; cover open; paper jam; no toner; not connected, etc.

A printer utility 24 in a client processor, by analyzing status responses returned from the above noted network subsystems, is able to compile a status response for the user. In fact, each subsystem returns a code value indicative of a particular condition status. Printer utility 24 includes a table which maps each possible returned code to a red, yellow or green status level. When other than a green status level results, a message is automatically displayed for the user indicating the particular status problem and a yellow or red light is displayed accordingly. At other times, a green light is displayed, indicating availability of the network and designated printer.

Figure 3A:
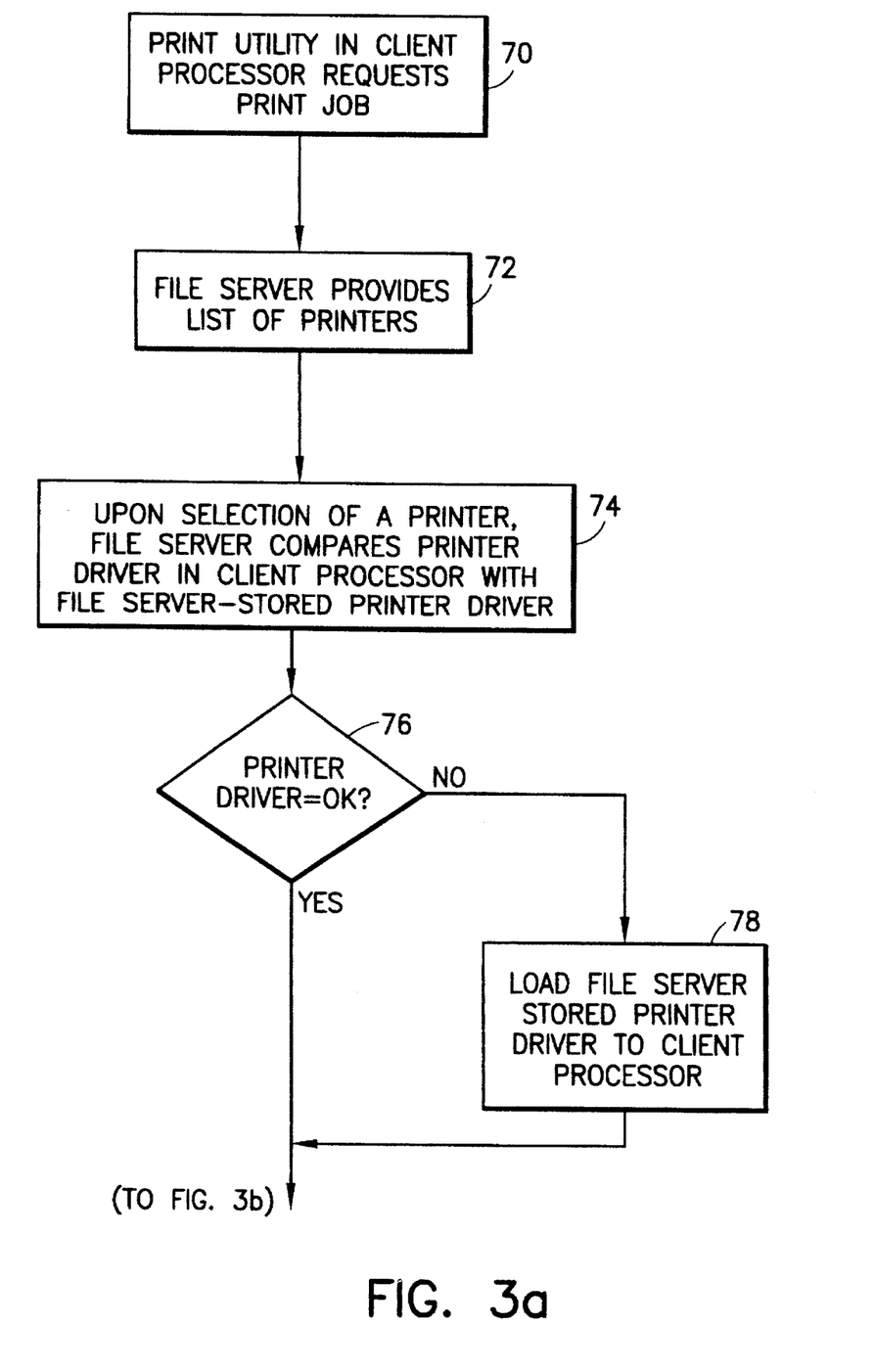
FIGS. 3a and 3b illustrate a logical flow diagram of the operation of one aspect of the invention.
Figure 3B:
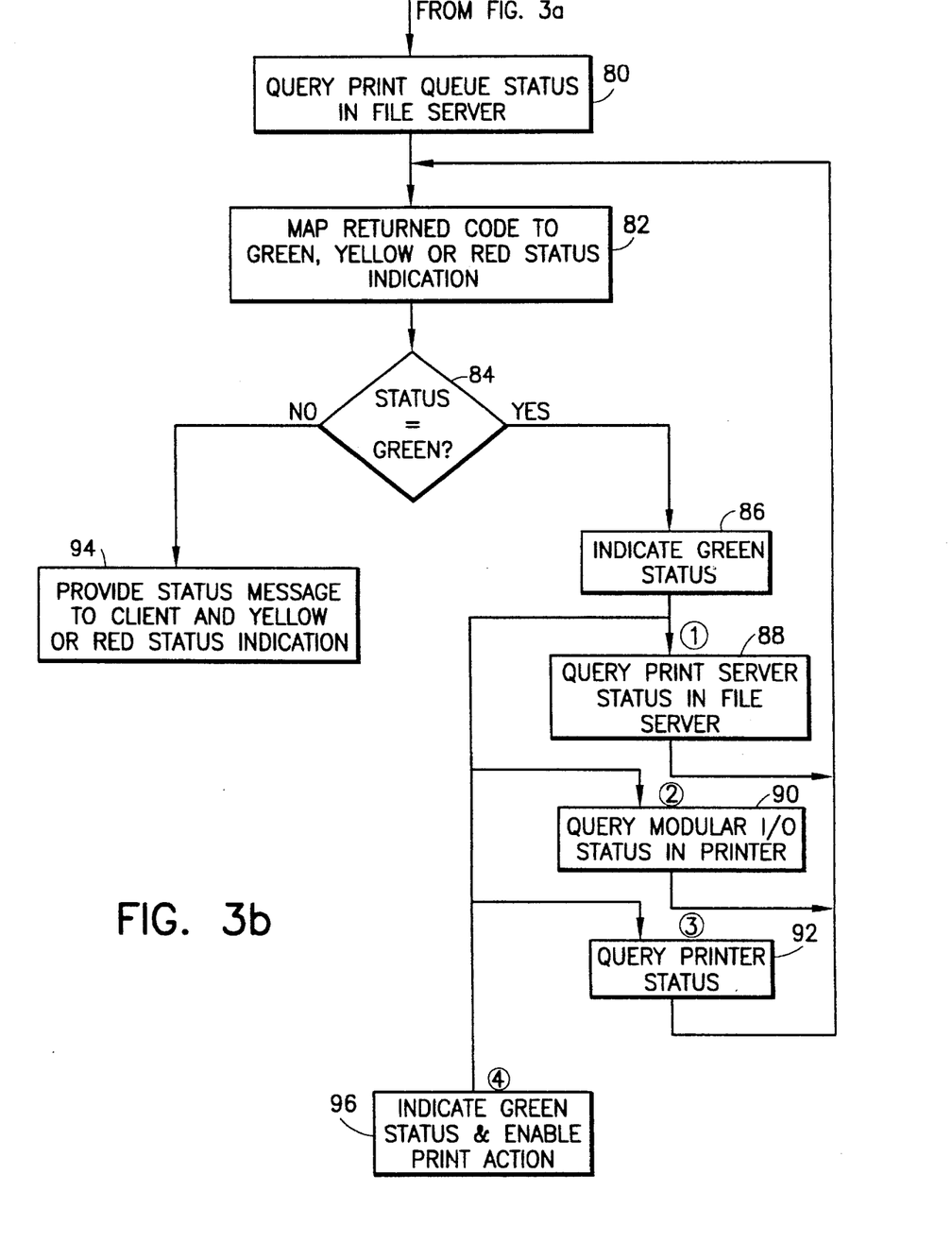

Turning now to the flow diagram of FIGS. 3a and 3b, the overall operation of the system of FIG. 1 will be described. Initially, a printer utility 24 in a client processor requests a print job from file server 16 (box 70). In response, file server 16 provides the requesting client processor with a list of available printers (box 72). Upon selection of a printer, the client processor causes file server 16, via printer/driver table 36 and printer/driver library 38, to compare the printer driver in library 38 with a printer driver 26 contained in the client processor (box 74). If the compared printer drivers do not match (decision box 76), an updated printer driver 26 is down-loaded into the client processor from printer/driver library 38 (box 78). In this manner, it is assured that the requesting client processor contains most updated printer driver 26 for the requested printer.

If decision box 76 indicates that the printer drivers match, printer utility 24 requests status information from the printer to be connected and, intervening network subsystems. Initially, printer utility 24 queries the status of a print queue 46 for the selected printer (box 80). In response, file server 16 passes a status message back to printer utility 24 indicating the status of the interrogated print queue 42. Printer utility 24 then maps the returned status code to either a green, yellow or red state (box 82). If the status code maps to a green state (decision box 84), a green status is indicated (box 86) and print server procedure 44 is queried to determine its status (box 88). The returned status code from print server procedure is mapped to the green, yellow or red state and if the status code maps to a green state (decision box 84), the same procedure occurs with respect to the status code returned from modular I/O card 30 in a selected printer (box 90) and then, if a green status is indicated, with respect to the status of the printer itself (box 92). If at any time during the above query actions, decision box 84 indicates that the status is other than green, a yellow or red status indication is manifest on a client processor's display and a status message is presented which indicates the particular problem (box 94). At this stage, the user has the ability to change printer selection, whereupon printer utility 24 commences a new series of status inquiries. If all status inquiries indicate green, then the green state is indicated upon the display (box 96) and the print action may continue.

Through the actions of printer utility 24 and printer administration utility 28, a client processor is assured of always having access to a most updated printer driver 26 for a selected printer. Furthermore, the user is immediately presented with a status message indicating the availability (or unavailability) of a selected printer without the user having to sequentially inquire into the status of intervening subsystems within the network.

The system, as described above, has been assumed to be operating in a Windows operating system environment. However, it may be the case that one or more client processors are running under a DOS operating system. To accommodate the possibility that client processor 14 (chosen to be the system administration processor) is operating under DOS, printer administration utility 28 is loaded onto client processor 14 in both DOS and Windows versions (see FIG. 5). In the prior art, if a user of client processor 14 (running under DOS) mistakenly entered the name of the Windows version of printer administration utility 28, an error message would be displayed indicating that printer administration utility 28 can only be run on a printer running the Windows operating system. This error message would have been contained in a "stub" portion of the Windows execution file of printer administration utility 28. That error message, in the prior art, would provide no indication to the user of where the DOS version of the printer administration utility 28 could be found.

Figure 5:
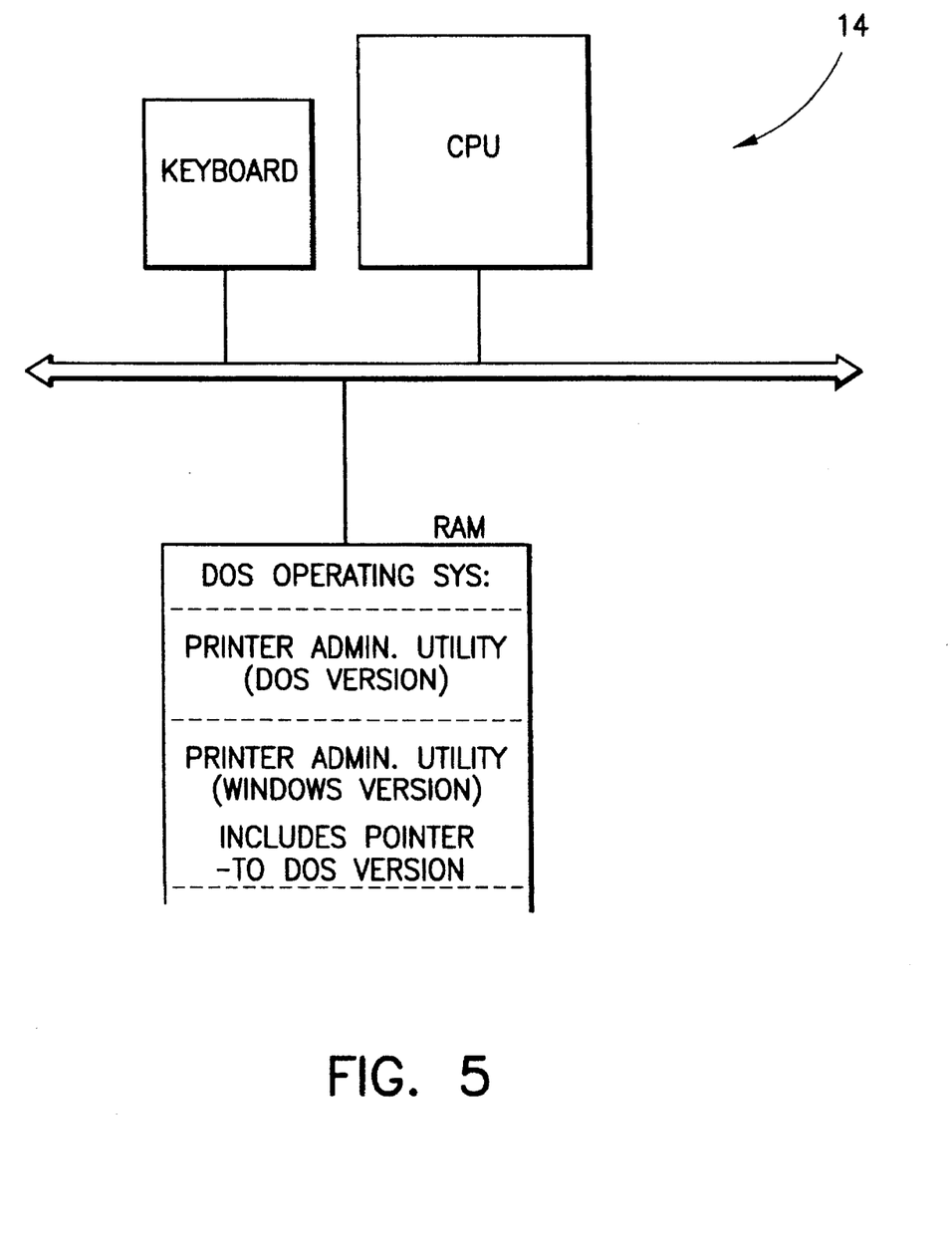
FIG. 5 is a block diagram illustrating the system that performs the process described in FIG. 4.

Instead, of placing an error message in the stub portion, of the Windows execution file, the stub portion is caused to contain a pointer to the DOS version of printer administration utility 28. Thus, if the Windows file name is mistakenly entered by the user (and the client processor is running under DOS), the Windows execution file accesses its stub portion and, under control of the pointer to the DOS printer administration utility file, issues a call to the DOS printer administration file, enabling it to be loaded in RAM within client processor 14.

Figure 4:
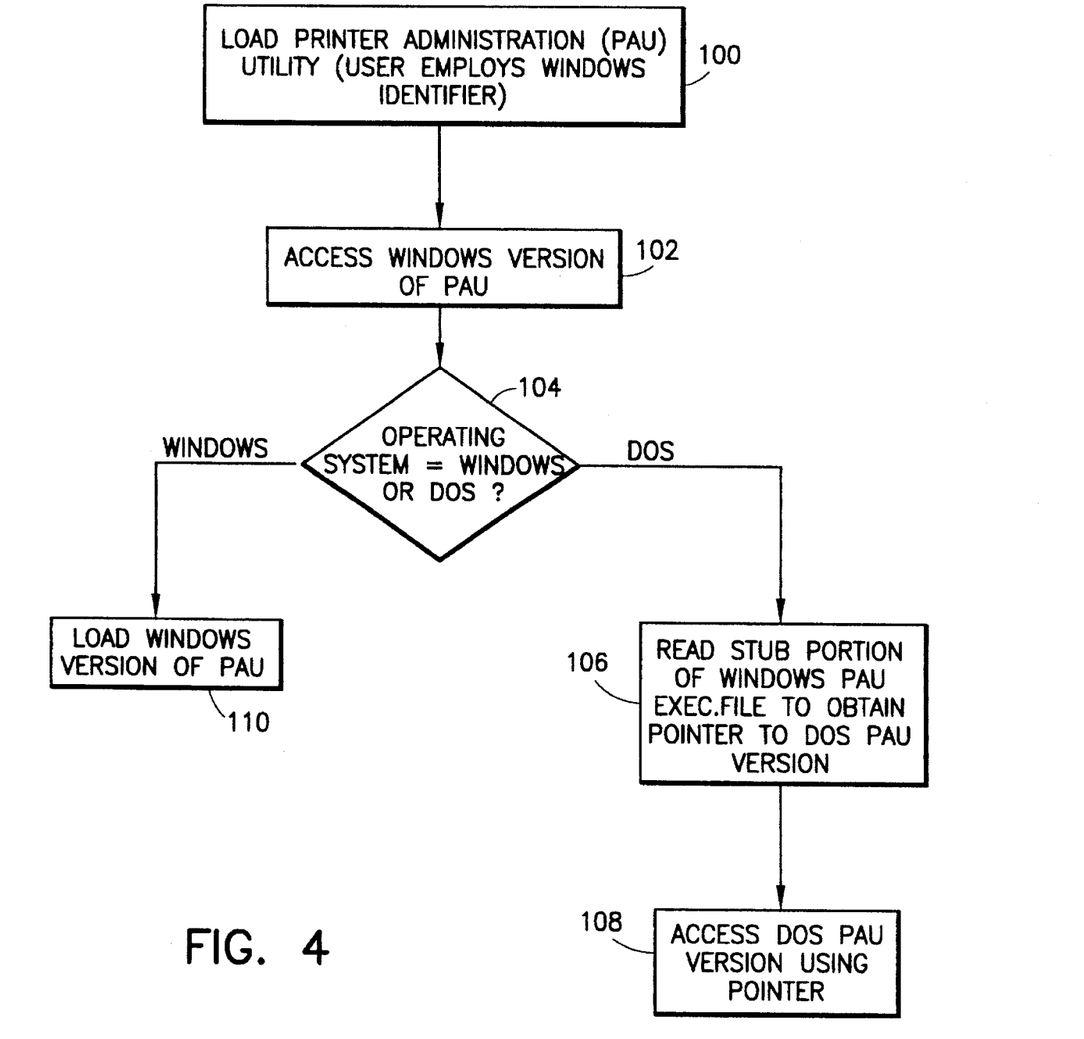
FIG. 4 is a logical flow diagram illustrating the operation of a further aspect of the invention.

This procedure is illustrated in FIGS. 4 and 5 wherein a load printer administration utility using an incorrect Windows file name is given by the user (box 100). As a result, the client processor accesses the Windows version of the printer administration utility (box 102). If the processor is operating in a DOS environment (decision box 104), the stub portion of the Windows printer administration utility execution file is read to obtain a pointer to the stored DOS printer administration utility (box 106). That version is then accessed (box 108) and stored in RAM to be ready for execution (box 108). If the client processor is running under Windows, then the Windows' version of the printer administration utility is loaded, as per normal (box 110).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A network including a file server with plural client processors and plural printers connected to said file server via a network path, said network comprising:

memory in each client processor for storing a printer driver procedure that enables communication between said client processor and at least one type printer;

memory in said file server for storing a library of most-updated printer driver procedures for each specific printer type of said plural printers, each printer driver procedure enabling a client processor to configure an output data stream that is recognized and operated upon by a specific printer type; and processor means in said file server, responsive to a print message from a requesting client processor, to enable assignment of a printer of said one type to said requesting client processor, said processor means in combination with said requesting client processor further determining if said printer driver procedure for said printer of said one type stored in said requesting client processor is identical to a printer driver procedure for a printer of said one type stored in memory of said file server and, and in response to non-identical printer driver procedures, causing alteration of said printer driver procedure in said requesting client processor to bring said printer driver procedure into coincidence with said most updated printer driver procedure for the printer of said one type.

2. The network as recited in claim 1 wherein said processor means enables assignment of a different printer type other than said one type to said requesting client processor and, upon determining an absence of a printer driver procedure for said different printer type in said requesting client processor, downloading to said requesting client processor from said library, a most updated printer driver procedure for said different printer type.

3. The network as recited in claim 1, wherein said memory in said requesting client processor includes a printer utility procedure which, in combination with said processor means in said file server, enables said requesting client processor to present to a user, a listing of printers on said network.

4. The network as recited in claim 3 wherein said printer utility procedure, in combination with said client processor and in response to a user's selection of a printer from said listing, provides a user-visible status level indication that informs the user of availability of said printer selected from said listing.

5. The network as recited in claim 4 wherein said status level indication further informs the user of a status of a network component if said network component indicates a status that prevents use of said printer selected from said listing.

6. The network a recited in claim 5 wherein said network components include a print queue in said memory of said file server, a print server procedure operating in said file server, input/output interface means associated with said selected printer, and said selected printer.

7. The network as recited in claim 6 wherein a status level is determined for each said network component in sequence, and wherein a first status level determined for a network component that prevents use of said printer selected from said listing, controls said user-visible status level indication on said client processor.

\* \* \* \* \*